United States Patent [19]

Ostby

[11] 4,380,796
[45] Apr. 19, 1983

[54] PORTABLE CONTROL BOX FOR COMPUTER NUMERICALLY CONTROLLED MACHINE TOOLS

[75] Inventor: Lyle D. Ostby, Brookfield, Wis.

[73] Assignee: Kearney & Trecker Corporation, Milwaukee, Wis.

[21] Appl. No.: 213,203

[22] Filed: Dec. 5, 1980

[51] Int. Cl.³ ............................................. G06F 15/46
[52] U.S. Cl. .............................. 364/171; 340/825.23; 364/138; 364/188; 364/474
[58] Field of Search ............... 364/138, 139, 171, 167, 364/146, 147, 188, 189, 474, 475; 340/825, 825.06, 825.22, 825.23, 825.69, 825.71, 825.72, 696; 318/16

[56] References Cited

U.S. PATENT DOCUMENTS

| | | | |
|---|---|---|---|
| 3,774,217 | 11/1973 | Bonner et al. | 340/825.69 X |
| 3,842,249 | 10/1974 | Geyer et al. | 340/825.22 X |
| 3,882,305 | 5/1975 | Johnstone | 364/200 X |
| 4,074,350 | 2/1978 | Roch et al. | 364/171 X |
| 4,109,309 | 8/1978 | Johnstone et al. | 340/825.23 X |
| 4,152,765 | 5/1979 | Weber | 364/171 X |
| 4,232,299 | 11/1980 | Eisenberg | 340/825.72 |

Primary Examiner—Joseph F. Ruggiero
Attorney, Agent, or Firm—Quarles & Brady

[57] ABSTRACT

Remote control of a computer numerically controlled (CNC) machine tool is facilitated by an intelligent portable control box coupled to the CNC machine tool through a radio frequency link, typically taking the form of a single conductor coaxial cable. The portable control box includes a transmit/receive circuit and a plurality of input devices and output devices, the transmit/receive circuit, the input devices and output devices all being coupled to, and controlled by a microcomputer. Information from the CNC machine tool indicative of machine tool operating conditions is transmitted across the RF link in the form of carrier keyed radio frequency signals to the portable control box. The transmit/receive circuit demodulates the carrier keyed signals and in accordance with the demodulated signals supplied thereto from the output transmit/receive circuit, the microcomputer renders the output devices operative to display machine tool operating characteristics. Operator commands in response to displayed machine operating conditions are entered through the input devices and are transmitted to the microcomputer which controls the operation of the transmit/receive circuit accordingly to cause the transmit/receive circuit to transmit carrier keyed radio frequency signals indicative of the operator entered commands to the CNC machine tool.

14 Claims, 6 Drawing Figures

PORTABLE CONTROL BOX FOR COMPUTER NUMERICALLY CONTROLLED MACHINE TOOLS

BACKGROUND OF THE INVENTION

This invention relates generally to computer numerically controlled (CNC) machine tools and more specifically, to a portable control box for remote controlling the operation of CNC machine tools.

Computer numerically controlled (CNC) machine tools such as are well known in the art, are usually comprised of a numerically controlled machine tool which is under the control of a control system comprised of a digital computer. The digital computer is provided with one or more machine part programs which, when executed, cause the computer to manipulate machine tool movement so that the machine tool performs the corresponding machining operation on the workpiece then in the machine tool work zone. Because machine tool vibration and heat may damage the control system digital computer and associated control circuitry, it is often necessary to physically separate the machine tool control system from the machine tool. With the machine tool control system physically separated from the machine tool, it then becomes necessary for the operator to move from the work zone of the machine tool to the control system to enter commands for altering machine tool operation. This is not only disadvantageous, but is also dangerous if the operator should become caught in the machine tool and be unable to reach the machine tool control system to actuate the necessary control thereon to stop machine tool operation.

In an effort to alleviate this danger, remote controls have been developed for controlling machine tool operations distal from the machine tool control system. Typically, such remote controls include a set of input/output devices mounted in a small hand-held box, and coupled to the machine tool control system by a heavy multi-conductor cable. Not only is such multi-conductor cable very expensive, but it is also very heavy and bulky. The use of such heavy multiconductor cables for coupling the input/output devices to the machine tool control system impairs operator mobility.

In contrast, the present invention concerns a portable control box for a CNC machine tool which obviates the need for large multi-conductor cables and thus, does not impair operator mobility.

It is an object of the present invention to provide a remote control for remote controlling a computer numerically controlled machine tool by transmitting commands to the computer numerically controlled machine tool across a radio frequency link, thereby obviating the need for heavy multiconductor cables; and It is another object of the present invention to provide a control system for remote controlling a computer numerically controlled machine tool which does not impair operator mobility.

BRIEF SUMMARY OF THE INVENTION

Briefly, in accordance with the preferred embodiment of the invention, a remote control unit for controlling the operation of a computer numerically controlled (CNC) machine tool from a location distal therefrom includes a data processing apparatus in the form of a microcomputer coupled to a transmit/receive circuit which is interfaced to the CNC machine tool through a radio frequency link, typically taking the form of a single coaxial cable. Information from the CNC machine tool indicative of machine tool operating conditions is transmitted across the radio frequency link to the transmit/receive circuit in the form of carrier keyed radio frequency signals which are demodulated by the transmit/receive circuit to provide the microcomputer with a digital signal varying accordingly. The microcomputer is responsive to the digital signals provided by the transmit/receive circuit and, in accordance therewith, the microcomputer renders one or more of a set of display devices operative to display CNC machine tool operating conditions to an operator. Operator commands, responsive to information displayed by the display devices indicative of CNC machine tool operating conditions, are entered through one or more of a set of input devices coupled to the microcomputer. The microcomputer is responsive to commands entered thereto from the input devices, and provides the transmit/receive circuit with a digital signal varying accordingly. In response to the digital signal supplied from the microcomputer, the transmit/receive circuitry pulses the carrier of the radio frequency signals transmitted across the RF link to control the operation of the CNC machine tool in accordance with operator commands.

BRIEF DESCRIPTION OF THE DRAWINGS

The features of the invention believed to be novel are set forth with particularity in the appended claims. The invention itself, however, both as to organization and method of operation, together with further objects and advantages thereof may best be understood by reference to the following description taken in conjunction by the accompanying drawings in which:

DETAILED DESCRIPTION OF THE PREFERRED EMBODIMENT

Figure 1:
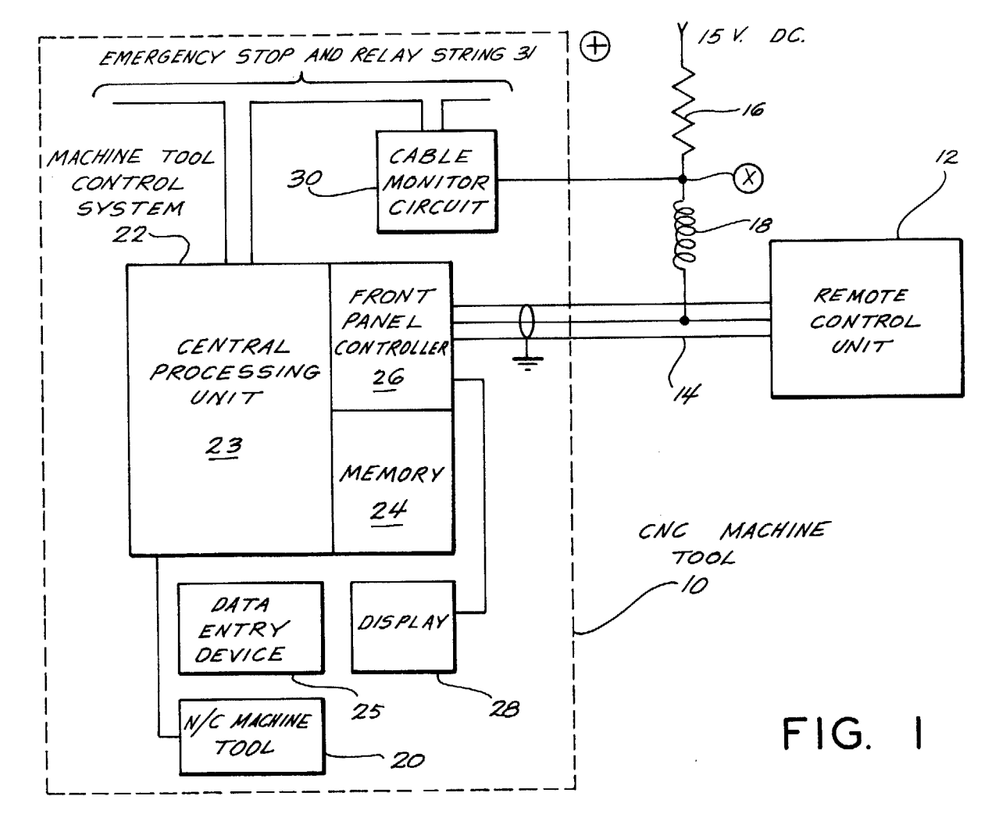
FIG. 1 is an electrical block diagram of a computer numerically controlled (CNC) machine tool coupled to the remote control unit of the present invention.

FIG. 1 illustrates a computer numerically controlled (CNC) machine tool 10 which is controlled remotely by a remote control unit 12 (described in greater detail with respect to FIG. 4) coupled to CNC machine tool 10 through a radio frequency link 14, typically taking the form of a single coaxial cable. With radio frequency link 14 comprised of a coaxial cable, remote control unit 12 is electrically energized through the coaxial cable from a 15 volt supply (not shown) coupled to the coaxial cable through the series combination of a resistance 16 and inductance 18. The junction between resistance 16 and inductance 18 will hereinafter be referred to as node X.

CNC machine tool 10 typically comprises a numerically controlled (N/C) machine tool 20, such as an N/C lathe, an N/C vertical or horizontal spindle machining center, which is coupled to, and controlled by a machine tool control system 22. Machine tool control system 22 includes a central processing unit 23, typically a digital computer, which is linked to a memory 24 that stores N/C machine part programs entered to central processing unit 23 through a data entry unit 25 coupled thereto.

A front panel controller 26 (described in greater detail with respect to FIG. 2) is coupled between remote control unit 12 and central processing unit 23 and serves to interface remote control unit 12 to the central processing unit as well as to interface the central processing unit to various input and output devices (not shown) mounted on an outward facing surface of the machine tool control system enclosure so as to be within the reach of a machine tool operator. Additionally, front panel controller 26 controls the operation of a display 28 connected thereto in accordance with commands from central processing unit 23 to display information indicative of machine tool control system operating characteristics.

When remote unit 12 is energized through coaxial cable 14 from the 15 volt power supply, CNC machine tool 10 usually includes a cable monitor circuit 30 (described in greater detail with respect to FIG. 6) which is coupled to the machine tool emergency stop (E-stop) logical AND relay string 31, which is the series electrical circuit through which the various relays (not shown) in the machine tool electrical circuit that control moving machine tool members are energized. Cable monitor circuit 30 is coupled to node X and monitors the voltage supplied to remote control unit 12. Should the voltage on coaxial cable 14, which is normally about 5 volts, become too high or too low, then as will be seen in greater detail hereinafter cable monitor circuit 30 causes the normally closed emergency stop logical AND relay string 31 to become an open circuit, thereby effectuating an emergency stop of N/C machine tool 20 moving members. Central processing unit 23 is also coupled to emergency stop logical AND relay string 31 and, should communication between remote control unit 12 and central processing unit 23 be interrupted for any length of time, then central processing unit 23 also causes the normally closed emergency stop logical AND relay string to open to effectuate an emergency stop of N/C machine tool moving members 20. In this manner, central processing unit 23 also monitors the operation of remote control unit 12 to provide redundancy of control should the remote control unit become inoperative.

Figure 2:
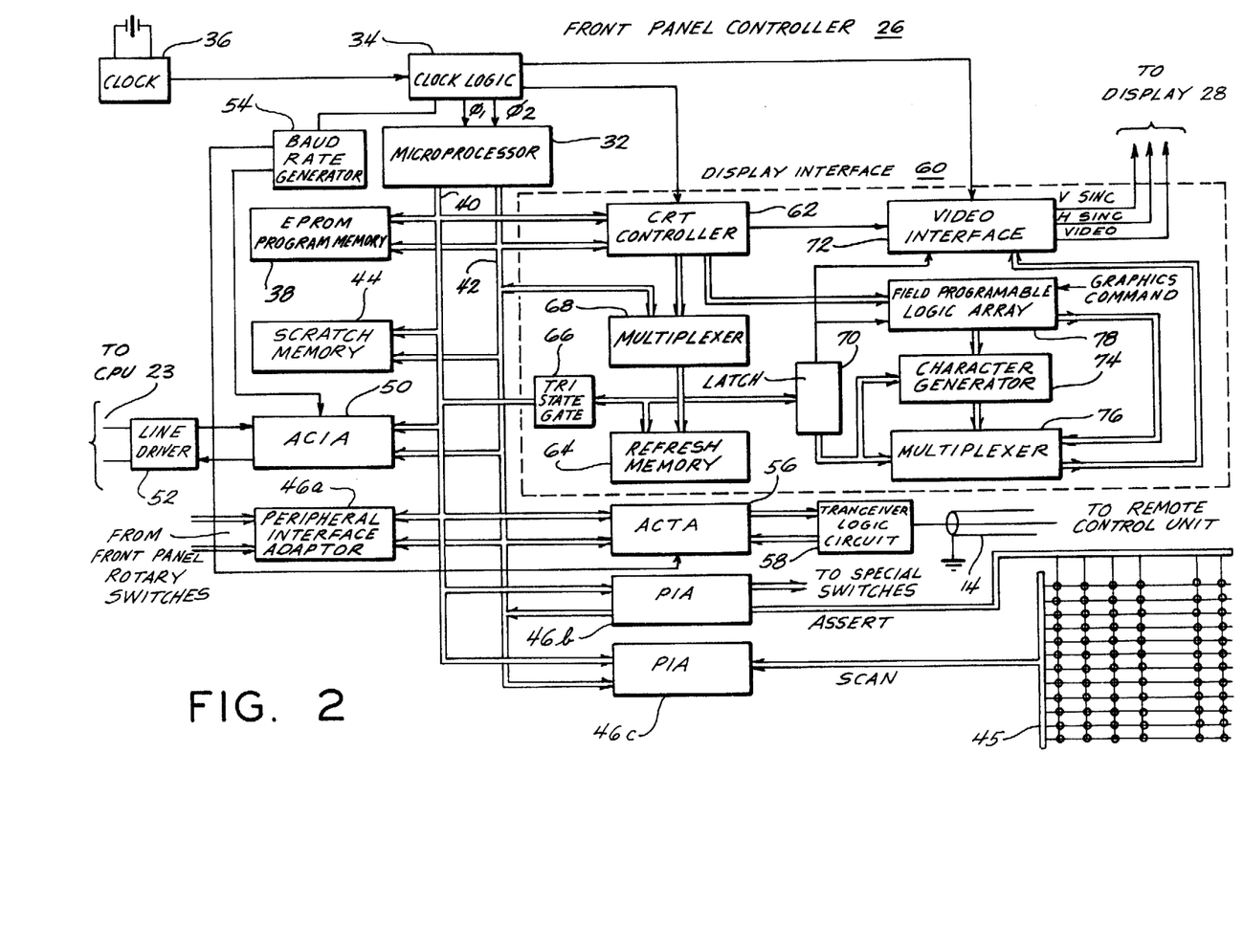
FIG. 2 is an electrical block diagram of the front panel controller comprising a portion of the CNC machine tool for interfacing the remote control unit.

Referring now to FIG. 2 there is shown a block diagram of front panel controller 26. Front panel controller 26 comprises a microprocessor 32, typically a model 6800 microprocessor as manufactured by Motorola Corporation, Phoenix, Ariz. With microprocessor 32 configured of a Motorola model 6800 microprocessor, a two phase clock signal is required for operation of this particular type of microprocessor and is supplied from a clock logic circuit 34, which includes a set of counters for generating the two phase clock signal as well as other periodic timing signals from a one (1) Mhz clock 36. The periodic timing signals produced by clock logic circuit 34 are utilized, as will be seen hereinafter, to synchronize the microprocessor to other circuit devices.

The software for microprocessor 32 is stored in a memory 38, typically a model 2716 electrically programmable read only memory (EPROM), such as manufactured by Intel Corporation, which coupled to microprocessor 32 through an eight bit data bus 40 and address bus 42. A second memory 44 is coupled to the microcomputer through data bus 40 and address bus 42 and serves as a scratch pad register for temporary storage of data.

Input of data to microprocessor 32 from the various input devices mounted on the outward facing surface of the control system enclosure, such as, rotary and special switches (not shown) as well as a touch pad switch array 45, is facilitated through a set of peripheral interface adapters (PIAs) 46a, 46b, and 46c, each typically configured of a Motorola model MC6821PIA and each coupled to microprocessor 32 through data bus 40 and address bus 42. PIA 46a is coupled to each of the control system front panel rotary switches (not shown) and transmits data entered by an operator through such rotary switches indicative of machine operating parameters such as spindle feedrate override and spindle speed override, to name a few, to the microprocessor. Peripheral interface adapters 46b and 46c are coupled to the assert and scan buses, respectively, of touch pad switch array 45, which is typically a 6×16 touch pad array, to facilitate the entry of data from the touch pad array to the microprocessor. PIA 46b is also coupled to the special switches (not shown) mounted on the control panel enclosure such as the emergency stop switch, to interface such switches to the microprocessor to facilitate the entry of data from such switches.

Microprocessor 32 is interfaced to central processing unit 23 of FIG. 2 through the series combination of an asynchronous communication interface adapter (ACIA) 50, typically a Motorola model MC6850/ACIA and a line driver 52. ACIA 50 is coupled to the data bus 40 and address bus 42, and to line driver 52, typically a model AM26LS31 line driver such as manufactured by Advance Micro Devices. Line driver 52 is coupled between ACIA 50 and central processing unit 23 and boosts the output signal of ACIA 50. ACIA 50 is programmable in accordance with instructions from microprocessor 32 and, pursuant to such instructions, ACIA 50 formats the data transmitted between the microprocessor and central processing unit 23 at a baud rate determined by the baud rate signal supplied to ACIA 50 from a baud rate generator 54, typically a Motorola model MC14411 baud rate generator. The baud rate signal generated by baud rate generator 54 varies in frequency in accordance with clock signals supplied to baud rate generator 54 from clock logic circuit 34.

A second ACIA 56, configured indentically to ACIA 50, is coupled to data bus 40 and address bus 42, and interfaces microprocessor 3 to a transceive logic circuit 58 (described hereinafter) to facilitate the transmission of data between the transceive logic circuit and microcomputer 32 at a baud rate varying in accordance with the baud rate signal supplied to ACIA 56 from baud rate generator 54. Transceive circuit 58 is coupled to coaxial cable 14 and is operative to transmit radio frequency signals across the coaxial cable to remote unit 12 illustrated in FIG. 4 in accordance with data received through ACIA 56 from microprocessor 32 indicative of machine tool operating conditions. The transceive logic circuit also is operative to demodulate radio frequency signals received from the remote control unit to provide microprocessor 32 with digital signals indicative of commands entered through the remote control unit.

As previously indicated, front panel controller 26 controls the operation of display 28 in accordance with commands from central processing unit 23. Where, as in the presently preferred embodiment, display 28 is a video monitor, front panel controller includes a video display interface 60 for interfacing video monitor 28 to microprocessor 32. Display interface 60 comprises a cathode ray tube (CRT) controller 62, typically configured of a Motorola model MC6845 CRT controller, which is coupled at its data and address bus inputs to data and address buses 40 and 42, respectively, and is coupled at its clock input to clock logic circuit 34. A refresh memory 64, for storing refresh information transmitted from microprocessor 32 through the series combination of bus 40 and tristate gate 66, receives address information from microprocessor 32 and CRT controller 62 through a multiplexer 68 and in accordance with address information received from microprocessor 32 and CRT controller 62, refresh memory 64 transmits refresh data stored at the appropriate address to a latch 70. A video interface 72, comprised of a shift register, is coupled to CRT controller 62 and, in accordance with commands from CRT controller 62, video interface 72, strobes latch 70 responsive to signals from clock logic circuit 34 to receive the data stored thereat for later transmission to display 28.

Display of character information by display 28 is facilitated by a character generator 74 which is coupled to and controlled by a field programmable logic array (FPLA) 76 in accordance with commands from CRT controller 62. Character generator 74 comprises a decoder which, when supplied with an eight bit display work from latch 70, the least significant bit of which determines the character intensity, cross references the eight bit display word to the corresponding character which is then transmitted to a multiplexer 78. The character stored in multiplexer 78 is then transmitted to video interface 72 in accordance with commands from CRT controller 62. When it is desired to display only the output word stored in latch 70, as is the case when graphic information is to be displayed then multiplexer 78, in response to commands from FPLA 76, strobes latch 70 and transmits the data stored thereat to video interface 72.

Field programmable logic array 76 is also responsive to graphic commands entered thereto by an operator and in accordance therewith, FPLA 76 manipulates the output data transmitted from multiplexer 78 to video interface 72 for example, to intensify certain characters or to increase their displayed size.

Figure 3:
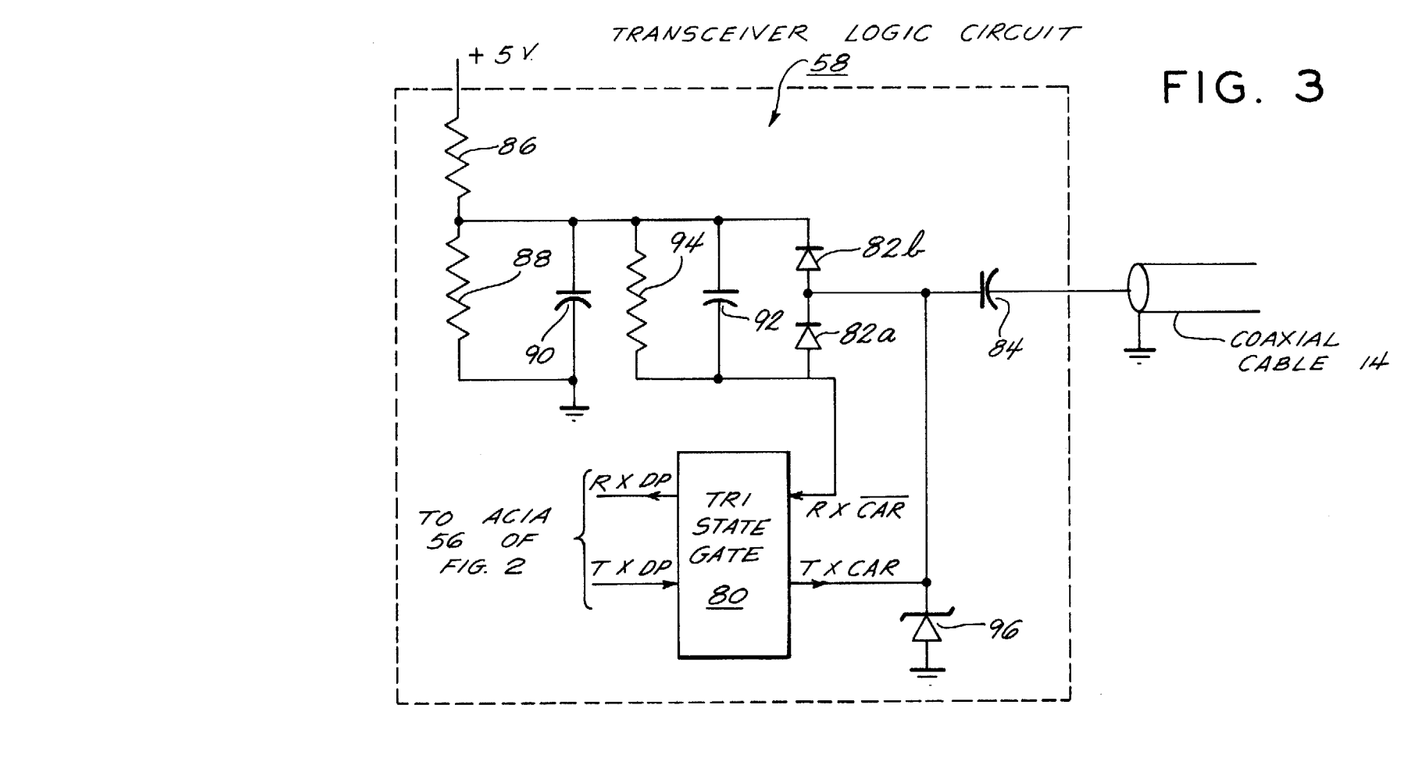
FIG. 3 is an electrical schematic diagram of transceive logic circuit comprising a portion of the front panel controller illustrated in FIG. 2.

The details of transceive logic circuit 58 are illustrated schematically in FIG. 3. In practice, transceive logic circuit 58 comprises a tristate gate 80, such as a model 74LS241 gate as manufactured by Texas Instruments, Dallas, Tex., which is coupled at its first input, to the anode of a first diode 82a. The cathode of diode 82a is coupled to the anode of a second diode 82b and to one terminal of a capacitance 84 whose second terminal is coupled to coaxial cable 14. Diode 82b is coupled to the anode through a resistance 86 to a 5 volt d.c. supply (not shown) whose output voltage is filtered by the parallel combination of a resistance 88 and a capacitance 90 coupled between the junction of resistance 86 and diode 82b and circuit ground.

An R-C circuit, comprised of the parallel combination of capacitance 92 and resistance 94, is coupled across diodes 82a and 82b and, in combination therewith, forms a detector circuit for demodulating the radio frequency signals transmitted across coaxial cable 14 from the remote control unit. Tristate gate 80 is responsive to the detector output signal, designated RXCAR, that is, the unipolar voltage at the anode of diode 82a with respect to circuit ground and, in accordance therewith, the tristate gate generates a digital output signal, designated RXDP, which is supplied to ACIA 56 illustrated in FIG. 2.

Tristate gate 80 is also responsive to digital signals designated TXDP, generated by microprocessor 32 as transmitted through ACIA 56, and in accordance therewith, tristate gate 80 modulates the carrier of a radio frequency signal TXCAR, accordingly, which signal, is supplied to the junction of diodes 82a and 82b and capacitance 84 for transmission across coaxial cable 14 to the remote control unit. A Zener diode 96 is coupled at its cathode to the junction of diodes 82a, 82b, and capacitance 84 and is coupled at its anode to circuit ground for clamping the signal level on the coaxial cable. Note that the radio frequency output signal TXCAR of gate 80, which is modulated in accordance with digital signal TXDP, will, when applied to the junction of diodes 82a and 82b, cause the demodulator circuit output signal RXCAR to be identical to the transmitted signal TXCAR so that during intervals when tristate gate 80 is transmitting radio frequency signal TXCAR to the remote control unit, the digital signal RXDP produced by the demodulator circuit will be identical therewith and will be supplied back to tristate gate 80.

Figure 4:
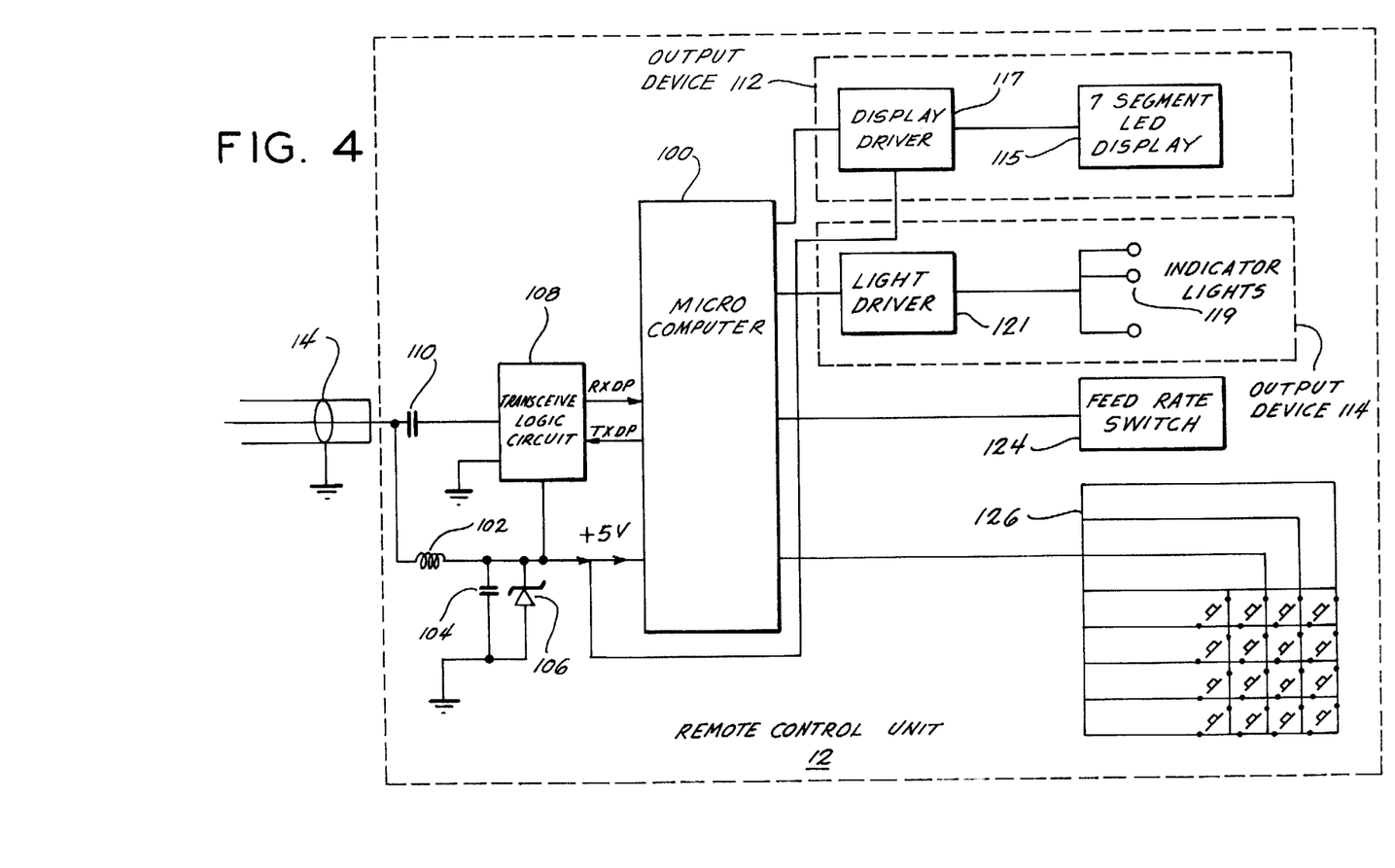
FIG. 4 is an electric schematic diagram of the remote control unit illustrated in FIG. 1.

The details of remote control unit 12 are illustrated in block form in FIG. 4. Remote control unit 12 comprises a microcomputer 100, typically a Motorola model MC6801 microcomputer, which is energized with 5 volts d.c. as stripped from the voltage on coaxial cable 14 by an L-C filter circuit comprised of an inductance 102, coupled between coaxial cable 14 and the junction of microcomputer 100 and the first terminal of a capacitance 104. The second terminal of capacitance 104 is coupled to circuit ground. A Zener diode 106 is coupled at its cathode to the junction of microcomputer 100 and capacitance 104 and at its anode to circuit ground for regulating the voltage supplied to the microcomputer.

A transceive logic circuit 108, configured identically to transceive logic circuit 58 described with respect to FIG. 3, is coupled through a capacitance 110 to coaxial cable 14. Transceive logic circuit 108 is energized from the L-C filter with 5 volts d.c. and demodulates radio frequency signals transmitted across coaxial cable 14 from the front panel controller to provide microcomputer 100 with a digital signal RXDP varying accordingly. Transceive logic circuit 108 is also responsive to digital signals TXDP generated by microcomputer 100 and in response, transmits a radio frequency signal, whose carrier is modulated accordingly, across coaxial cable 14 to the front panel controller to control machine tool operation accordingly.

Figure 5:
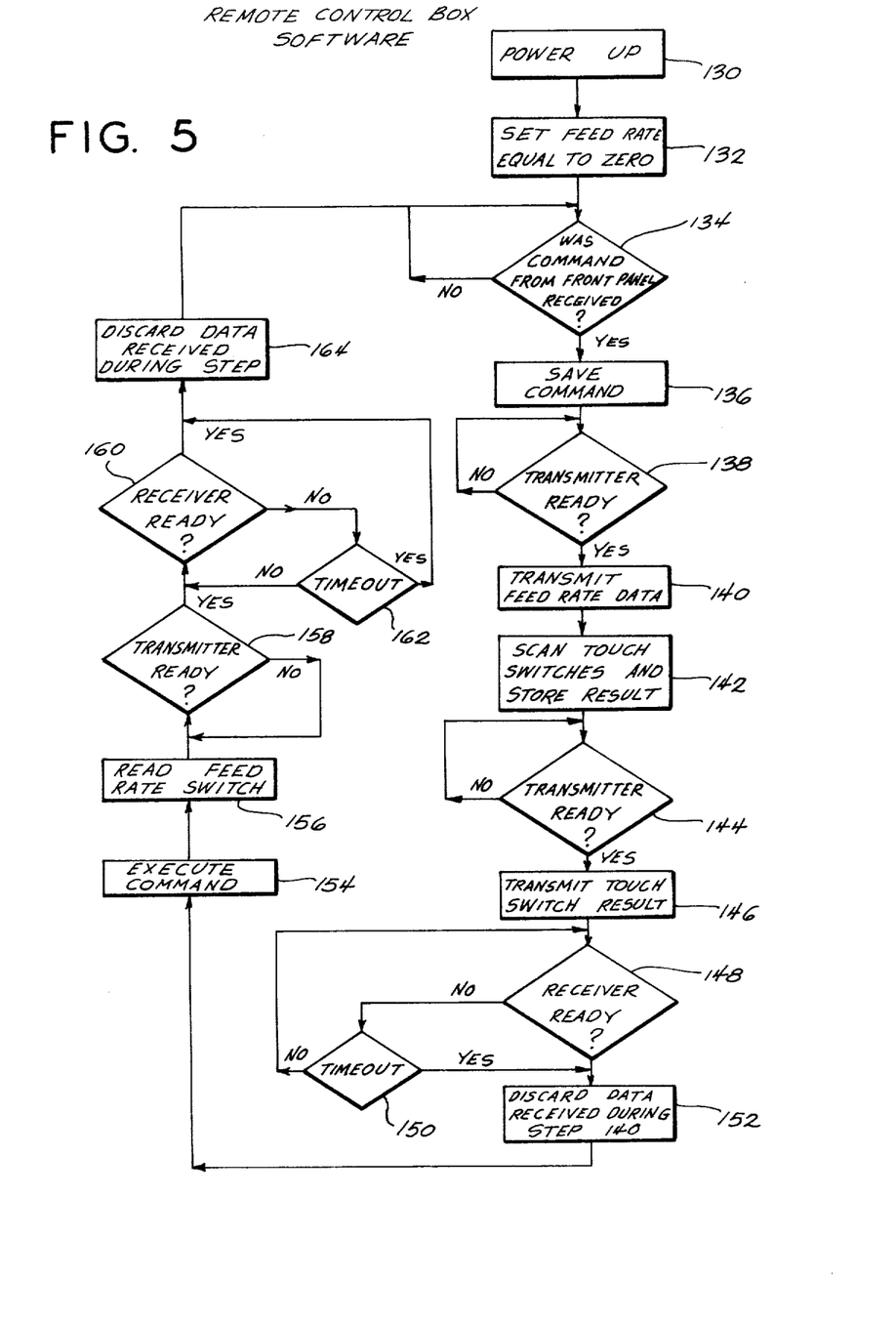
FIG. 5 is a flow chart representation of the software executed by the microcomputer of the remote control unit of FIG. 4 during operation.

As will be described in greater detail with respect to the microcomputer software illustrated in flow chart form in FIG. 5, microcomputer 100 is programmed to be responsive to the digital signals RXDP produced by transceive logic circuit 108 in accordance with commands from the machine tool control system, and to control the operation of a set of display devices 112 and 114 accordingly to display machine tool operating conditions to a human operator. Although output devices 112 and 114 can be comprised of any well known type of display device, in practice, output device 112 comprises a seven segment light emitting diode display 115 which is driven by a display driver circuit 117 and output device 114 comprises a set of indicator lights 119 driven by a light driver circuit 121. Both display driver 117 and light driver 121 are energized from the L-C filter with a 5 volt d.c. voltage and each drives a respective one of light emitting diode display 115 and indicator lights 119 in accordance with signals supplied thereto from microcomputer 100.

Microcomputer 100 is responsive to operator commands entered thereto in response to displayed conditions through each of input devices 124 and 126, typically taking the form of a feedrate switch and an array of touch pad switches, respectively. In accordance with signals received from feedrate switch 124 indicative of an operator desired machine feedrate and input signals from touch pad switch array 126 indicative of other machine tool commands such as coolant enable, cycle stop and X, Y, and Z position display, to name a few, microcomputer produces the digital signals TXDP supplied to transceive logic circuit 108. As indicated, transceive logic circuit is responsive to the digital signal TXDP produced by microcomputer 100 and, in response, transmits radio frequency signals, whose carrier is modulated accordingly, to the front panel controller to control machine tool operation accordingly.

The details of microcomputer 100 operation will now be described with respect to FIG. 5 which illustrates, in flow chart form, the software executed by microcomputer 100. At the outset of remote control unit operation, a d.c. voltage is applied to the coaxial cable (step 130) to energize the remote control unit. Also, at the outset of remote control unit operation, feedrate switch 124 (illustrated in FIG. 4) is set to zero.

Remote control unit operation is commenced in response to a command from the front panel controller indicative of machine tool operating conditions. Since remote control unit 12 (FIG. 1) never itself initiates data transmission, but rather must await a command from the front panel controller, the remote control unit constantly checks to ascertain whether or not a front panel controller command has been received (step 134). Once a command is received, it is stored (step 136) for later execution. Execution of the front panel controller command is delayed, so that transmission of data entered through input devices 124 and 126 (both illustrated in FIG. 4) to machine tool control system 22 (FIG. 1) may occur which permits optimum utilization of transceive logic circuit 108 (illustrated in FIG. 4) and microcomputer 100 by reducing the delay between receipt of data and its subsequent transmission.

Following storage of the command received from the front panel controller, transceive logic circuit 108 is checked by microcomputer 100 to determine whether or not it is ready to transmit radio frequency signals indicative of operator commands entered through feedrate switch 124 (step 136). When transceive logic circuit 108 is ready to transmit, microcomputer 100 supplies the transceive logic circuit with digital signals TXDP generated in accordance with feedrate data entered through switch 124 (step 138) and in response, transceive logic circuit 108 transmits a radio frequency signal, whose carrier is modulated accordingly, across coaxial 14 (step 140).

Following feedrate data transmission, microcomputer 100 scans touch pad switch array 126 and stores data indicative of touch pad switch closure (step 142). Thereafter, the microcomputer checks transceive logic circuit 108 to determine whether or not the transceive logic circuit is ready to transmit data indicative of touch pad switch array closure to the front panel controller (step 144). When the transceive logic circuit is ready to transmit, microcomputer 100 provides the transceive logic circuit with digital signals TXDP generated in accordance with the previously received data indicative of touch pad switch array closure, and in response, the transceive logic circuit modulates the carrier of the radio frequency signal transmitted to the front panel controller accordingly.

Upon completion of transmission of touch pad switch array data, microcomputer 100 checks transceive logic circuit 108 to determine whether or not the transceive logic circuit is ready to receive further commands from the front panel controller (step 148). In practice, there is a time delay between when the tristate gate 80 (FIG. 3) finishes transmitting radio frequency signals TXCAR to remote control unit 12 and when it completes reception of signals RXCAR supplied thereto by the demodulator circuit simultaneously with the transmission of signals TXCAR. Thus, after data has been transmitted by the tristate gate (and applied simultaneously to the demodulator circuit), the tristate gate may still be receiving the demodulated data from the demodulator circuit. Should transceive logic circuit 108 be unready to receive information from the front panel controller because the tristate gate is still receiving data from the demodulator circuit, then an interval counter within microcomputer 108 begins counting to a predetermined count sequence (step 150). Following completion of the interval counter count sequence, or earlier should transceive logic circuit 108 become ready to receive data, then, the feedrate data supplied by microcomputer 100 simultaneous with the feedrate data transmitted by the transceive logic circuit (step 140) is erased. Since the demodulator circuit and the tristate gate comprising transceive logic circuit 108 are coupled in parallel, any data transmitted by the tristate gate will also be supplied to the microcomputer and thus, to avoid any confusion, this duplicative data must be erased.

Following erasure of the duplicative feedrate data, microcomputer 100 commences execution of the front panel controller command (step 154) which was previously stored thereat (step 136) and accordingly, transmits commands to display driver 117 and light driver 121 (both illustrated in FIG. 4) to energize light emitting diode display 115 and indicator lights 119, respectively, (both illustrated in FIG. 4) to display information indicative of machine tool operating conditions. Thereafter, microcomputer 100 reads feedrate switch 124 to obtain operator-entered feedrate information therefrom (step 156).

Once feedrate information is obtained from feedrate switch 124 and stored, microcomputer 100 checks transceive logic circuit 108 to determine whether it is ready to transmit feed-rate information during the next operating cycle (step 158). Thereafter, the transceive logic circuit is checked to determine whether the demodulator circuit therein has completed receiving and demodulating touch pad switch array closure data (step 160) that was transmitted previously (step 140). As before, should transceive logic circuit 108 not be ready to receive commands from the front panel controller, an interval counter within the microcomputer is started (step 162). Following completion of the interval counter count sequence, or earlier should the transceive logic circuit become ready to receive data, data received by the microcomputer indicative of the just previously transmitted touch pad switch array information (step 146) is erased (step 166).

The remote control unit operating cycle is completed upon erasure of the duplicative touch pad switch array closure information and the microcomputer then awaits the next front panel controller command (step 134) before beginning the next operating cycle.

Figure 6:
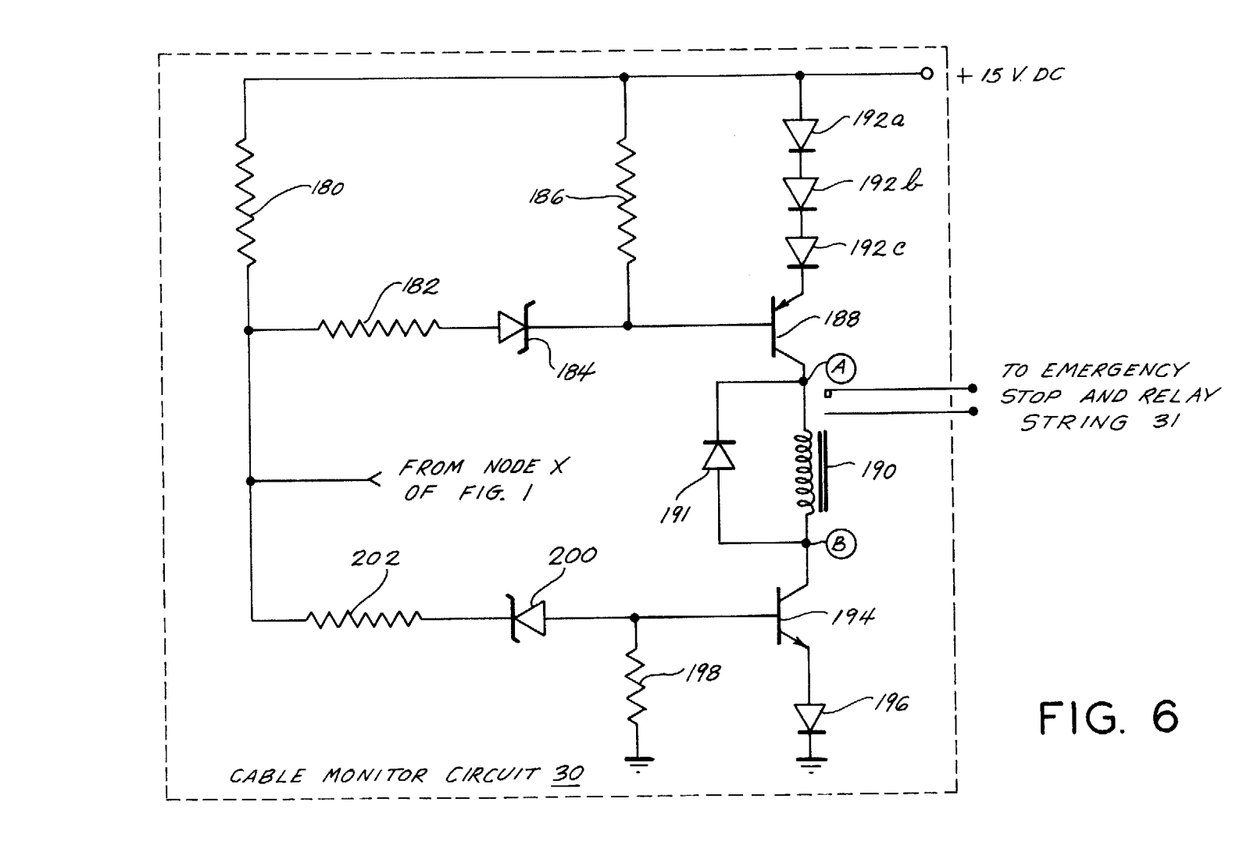
FIG. 6 is an electrical schematic diagram of the cable monitor circuit comprising a portion of the CNC machine tool of FIG. 1.

FIG. 6 schematically illustrates the details of cable monitor circuit 30. Cable monitor circuit 30, although as previously indicated, is not crucial to the operation of the remote control unit, but nevertheless, advantageously causes an emergency stop condition to occur should the voltage on coaxial cable 14 (illustrated in FIG. 1) become too low or too high. The cable monitor circuit includes a voltage divider network comprised of a pair of resistances 180 and 182, resistance 180 being coupled between node X (illustrated in FIG. 1) and a 15 volt d.c. supply and resistance 182 being coupled between node X and the anode of a Zener diode 184. The cathode of Zener diode 184 is coupled through a resistance 186 to the 15 volt d.c. supply and is coupled to the emitter of a PNP transistor 188. The collector of transistor 188 is coupled to the first coil terminal, designated A, of a relay 190 and to the cathode of a diode 191. The anode of diode 191 is coupled to the second relay coil terminal designated B. The emitter of transistor 188 is coupled through a diode string comprised of diodes 192a, 192b, and 192c to the 15 volt d.c. supply. In practice, resistances 180, 182, and 186 are selected of such an ohmic value so that when the voltage at node X (as measured with respect to ground) is 5 volts d.c. or less, then diode 184 is in an avalanche condition, causing transistor 188 to be forward biased and hence conductive.

Relay 190 is coupled at its second coil terminal B to the collector of an NPN transistor 194 whose emitter is coupled through a diode 196 to circuit ground. The base of transistor 194 is coupled through a resistance 198 to circuit ground and is coupled to the anode of a Zener diode 200 whose cathode is coupled through a resistance 202 to node X. In practice, resistances 198 and 202 are selected of such an ohmic value so that when the voltage at node X with respect to ground is 5 volts d.c. or greater, then Zener diode 200 is in an avalanche condition, thereby forwarding biasing transistor 194.

During normal operation, when a voltage of approximately 5 volts d.c. is present at node X, both of Zener diodes 184 and 200 are in an avalanche condition, thereby forward biasing transistors 188 and 194, respectively, causing relay 190 to be energized. With relay 190 energized, the set of normally open relay contacts, which are coupled in series with emergency stop logical AND relay string 31, are closed, thereby providing a completed path for electrical currents through the string (assuming no other set of relay contacts are open) to energize the various relays controlling the machine tool moving members so as to permit normal machine tool operation. Should the voltage at node X become larger than 5 volts d.c. then, diode 184 will no longer be in an avalanche condition, thereby forcing transistor 188 nonconductive, causing de-energization of relay 190. When relay 190 become de-energized, then the emergency string stop logical AND relay string is no longer a completed circuit, causing an emergency stop condition. Likewise, relay 190 is also de-energized when the voltage at node X becomes less than 5 volts d.c., because when the voltage at node X drops below 5 volts d.c., then a Zener diode 200 will no longer be in an avalanche condition, thereby preventing forward biasing of transistor 194.

The foregoing describes a remote control unit for a computer numerically controlled machine tool which controls machine operation by transmitting radio frequency signals to the machine tool across a radio frequency link, typically a coaxial cable, and which displays machine tool operating condition in accordance with radio frequency signals received from the computer numerically controlled machine tool across the radio frequency link. The transmission of radio frequency signals between the remote control unit and the computer numerically controlled machine tool obviates the need for a heavy multiconductor cable to carry information between the remote control unit and the computer numerically controlled machine tool, and thus allows for unimpaired operator mobility.

Although the illustrative embodiment of the invention has been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of this invention having now been fully explained in connection with the foregoing, I hereby claim as my invention:

1. For use with a control apparatus, a remote control unit for transmitting commands to said control apparatus to control the operation thereof and for receiving and displaying information from said control apparatus indicative of control apparatus operating conditions comprising:

a plurality of input devices actuable by an operator for entering commands to said control system;

transmit and receive circuitry for transmitting radio frequency signals to said control system and for receiving and demodulating radio frequency signals from said control system;

a radio frequency link coupling said transmit and receive circuitry to said control system;

a plurality of output devices visible to an operator for displaying information indicative of control system operating characteristics; and data processing means coupled to each of said plurality of input devices and to said receive and transmit circuit for modulating the carrier of the radio frequency signals transmitted by said transmit and receive circuitry in accordance with commands entered through said input devices and, said data processing means coupled to said output devices and being responsive to demodulated radio frequency signals received from said transmit and receive circuitry for energizing said display devices accordingly to display information indicative of control system operating conditions.

2. The invention according to claim 1 wherein said radio frequency link coupling the control system to said transmit and receive circuitry is a single coaxial cable.

3. The invention according to claim 1 wherein said plurality of input devices include:
   a rotary switch; and
   an array of touch pad switches.

4. The invention according to claim 1 wherein said plurality of output devices includes:
   a light emitting diode display;
   means for driving said light emitting diode display in accordance with signals from data processing means;
   a set of indicator lights; and
   means for driving said indicator lights in accordance with signals supplied by said data processing means.

5. The invention according to claim 1 wherein said transmit and receive circuitry comprises:
   a demodulator circuit for demodulating the radio frequency signals transmitted from the control apparatus cross said radio frequency link to produce an output signal varying accordingly;
   coupling means for connecting said demodulator circuit to said radio frequency link; and
   a logic circuit coupled to said demodulator circuit and to said coupling means for supplying said data processing means with a digital signal varying in accordance with said demodulator circuit output signal and for supplying a radio frequency signal to said coupling means for transmission across a coaxial cable to the control apparatus whose carrier is modulated in accordance with signals received from said data processing means.

6. The invention according to claim 1 wherein said data processing means comprises a microcomputer.

7. A computer numerically controlled machine tool system comprising:
   a numerically controlled machine tool;
   a machine tool control system coupled to said machine tool for controlling machine tool operation in accordance with radio frequency signals supplied thereto and for transmitting radio frequency signals indicative of machine tool operating conditions;
   a remote control unit including computer means responsive to operator commands for transmitting radio frequency signals to said machine tool control system for controlling machine tool operation and for displaying machine tool operating conditions to the operator in accordance with radio frequency signals received from said machine tool control system; and
   a radio frequency link coupled between said machine tool control system and said remote control unit for carrying radio frequency signals therebetween.

8. The invention according to claim 7 wherein said radio frequency link is a single coaxial cable.

9. The invention according to claim 7 and further including a direct current voltage power supply coupled to said coaxial cable for energizing said remote control unit; and
   a cable monitor circuit coupled to said direct current voltage supply and to said coaxial cable for monitoring the voltage on said coaxial cable and for interrupting the machine tool emergency stop logical "AND" relay string to effectuate stopping of machine tool moving members when the voltage on said coaxial cable is unequal to a predetermined voltage.

10. The invention according to claim 7 wherein said remote control unit comprises:
    a plurality of input devices actuable by an operator for entering commands to said machine tool control system to control machine tool operation;
    transmit and receive circuitry coupled to said radio frequency link for transmitting radio frequency signals to said machine tool control system and for receiving and demodulating radio frequency signals received from said machine tool control system;
    a plurality of output devices visible to an operator for displaying information indicative of control system operating characteristics; and
    data processing means coupled to each of said plurality of input devices and to said receive and transmit circuitry for modulating the carrier of the radio frequency signals transmitted by said transmit and receive circuitry in accordance with commands entered through said input devices and, said data processing means coupled to said output devices and being responsive to demodulated radio frequency signals received from said transmit and receive circuitry for energizing said display device accordingly to display information indicative of control unit operating conditions.

11. The invention according to claim 10 wherein said plurality of input devices include:
    a rotary switch; and
    an array of touch pad switches.

12. The invention according to claim 10 wherein said plurality of output devices include:
    a light emitting diode display;
    means for driving said light emitting diode display in accordance with signals from data processing means;
    a set of indicator lights; and
    means for driving said indicator lights in accordance with signals supplied by said data processing means.

13. The invention according to claim 10 wherein said transmit and receive circuitry comprises:
    a demodulator circuit for demodulating radio frequency signals transmitted from said machine tool control system to produce an output signal varying accordingly;
    coupling means for connecting said demodulator circuit to said radio frequency link; and
    a logic circuit coupled to said demodulator circuit and to said coupling means for supplying said data processing means with a digital signal varying in accordance with said demodulator circuit output signal and for supplying a radio frequency signal to said coupling means for transmission across said radio frequency link in accordance with signals received from said data processing means.

14. A computer numerically controlled machine tool system comprising:
    a numerically controlled machine tool;
    a machine tool control system coupled to said machine tool for controlling machine tool operation and for displaying machine tool operating conditions to the operator in accordance with radio frequency signals received from said machine tool control system;

a coaxial cable coupled between said machine tool control system and said remote control unit for carrying radio frequency signals therebetween;
a direct current voltage power supply coupled to said coaxial cable for energizing said remote control unit; and
a cable monitoring circuit including:
  a power supply;
  an electrically actuable switch coupled in series with the machine tool emergency stop logical AND relay string to provide a completed circuit path for electrical current when said electrically actuable switch is energized from said power supply and for interrupting the path of electrical current when said electrically actuable switch is deenergized from said power supply to cause said machine tool control system to effectuate an emergency stop of machine tool moving members; and
  first and second circuit means coupled in series with said power supply and electrically actuable switch, said first circuit means being responsive to the voltage on said coaxial cable for providing a completed path for electrical current when the voltage on said coaxial cable is substantially equal to a predetermined voltage and said first circuit means being rendered inoperative to carry electrical current when the voltage on said coaxial cable becomes greater than said predetermined voltage, and said second circuit means being responsive to the voltage on said coaxial cable for providing a completed path for electrical current when the voltage on said coaxial cable is equal to a predetermined voltage and being rendered inoperative to carry electrical current when the voltage on said coaxial cable is less than said predetermined voltage.

* * * * *